United States Patent
Hayashi et al.

(10) Patent No.: US 9,946,338 B2
(45) Date of Patent: Apr. 17, 2018

(54) INFORMATION PROCESSING TO VARY SCREEN DISPLAY BASED ON A GAZE POINT OF THE USER

(71) Applicant: SONY CORPORATION, Tokyo (JP)

(72) Inventors: Kazunori Hayashi, Tokyo (JP); Yoichiro Sako, Tokyo (JP); Takayasu Kon, Tokyo (JP); Yasunori Kamada, Kanagawa (JP); Takatoshi Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 566 days.

(21) Appl. No.: 14/168,611

(22) Filed: Jan. 30, 2014

(65) Prior Publication Data

US 2014/0232639 A1 Aug. 21, 2014

(30) Foreign Application Priority Data

Feb. 15, 2013 (JP) ................. 2013-027673

(51) Int. Cl.
*G06F 3/01* (2006.01)
*G06F 3/048* (2013.01)
*G06F 3/0485* (2013.01)

(52) U.S. Cl.
CPC .............. *G06F 3/013* (2013.01); *G06F 3/048* (2013.01); *G06F 3/0485* (2013.01); *G06F 2203/04806* (2013.01)

(58) Field of Classification Search
CPC .......... G06F 3/016; G06F 3/011; G06F 3/038; G06F 3/013
See application file for complete search history.

(56) References Cited

U.S. PATENT DOCUMENTS

| | | | | |
|---|---|---|---|---|
| 5,850,211 A | * | 12/1998 | Tognazzini | G06F 3/013 345/158 |
| 5,912,721 A | * | 6/1999 | Yamaguchi | G06K 9/0061 351/209 |
| 9,355,612 B1 | * | 5/2016 | Shepard | G09G 5/006 |
| 2008/0005700 A1 | * | 1/2008 | Morikawa | G06F 3/0482 715/841 |
| 2011/0006978 A1 | * | 1/2011 | Yuan | G06F 3/013 345/156 |
| 2011/0273466 A1 | * | 11/2011 | Imai | G09G 3/20 345/589 |

(Continued)

FOREIGN PATENT DOCUMENTS

| | | |
|---|---|---|
| JP | H09-297651 A | 11/1997 |
| JP | 2009-054101 A | 3/2009 |

*Primary Examiner* — Alexander Eisen
*Assistant Examiner* — Mansour M Said
(74) *Attorney, Agent, or Firm* — Chip Law Group

(57) ABSTRACT

There is provided an information processing apparatus including a detection unit configured to detect a gaze point of a user in a display image displayed on a display unit, an estimation unit configured to estimate an intention of the user based on the gaze point detected by the detection unit, an image generation unit configured to generates a varying image that subtly varies from the display image to a final display image according to the intention estimated by the estimation unit, and a display control unit configured to control the display unit in a manner that the varying image generated by the image generation unit is displayed.

18 Claims, 8 Drawing Sheets

(56) References Cited

U.S. PATENT DOCUMENTS

| | | | | |
|---|---|---|---|---|
| 2011/0298702 A1* | 12/2011 | Sakata | .................... | G06F 3/013 |
| | | | | 345/156 |
| 2013/0227472 A1* | 8/2013 | Sosinski | ............... | G06F 3/0481 |
| | | | | 715/794 |

* cited by examiner

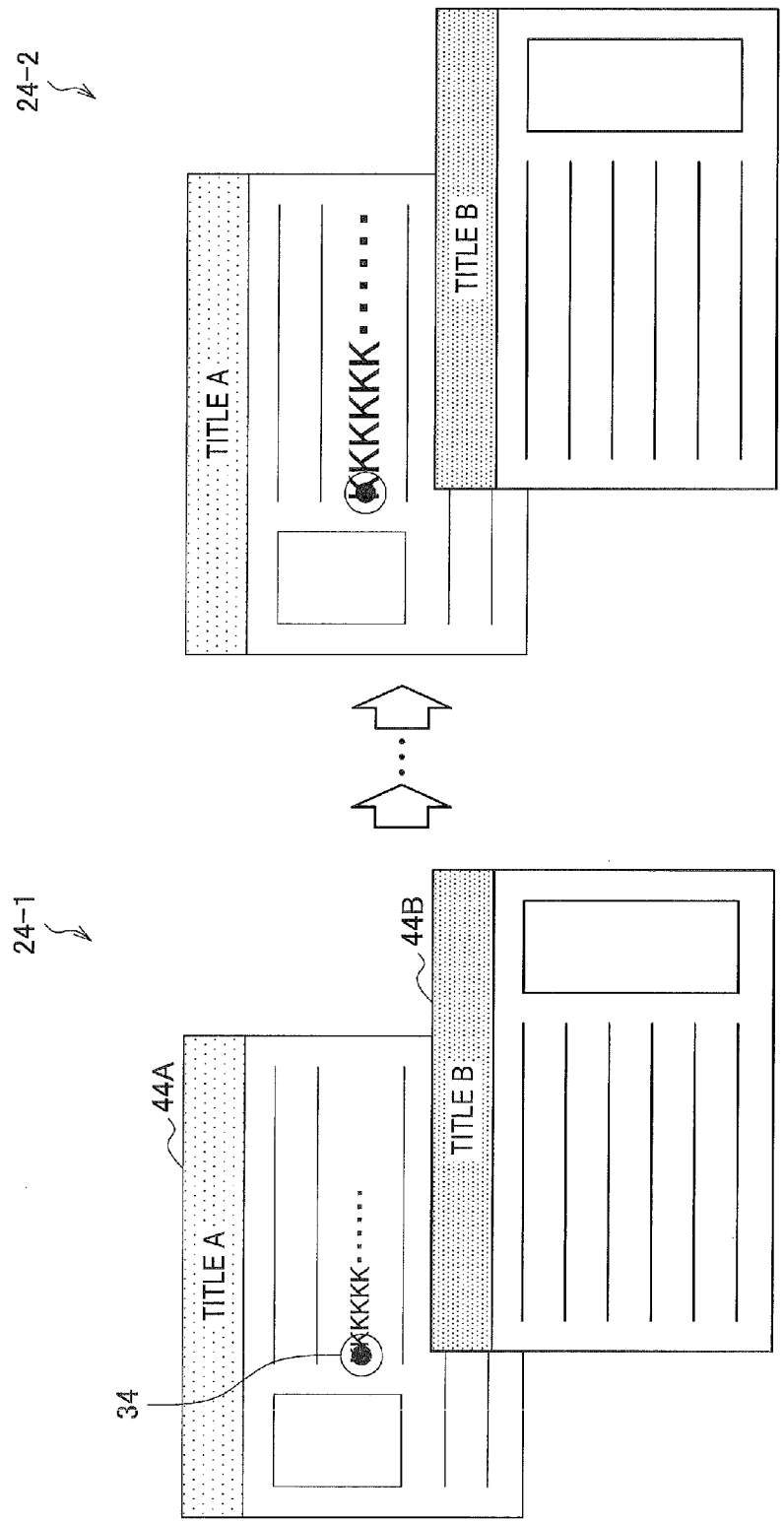

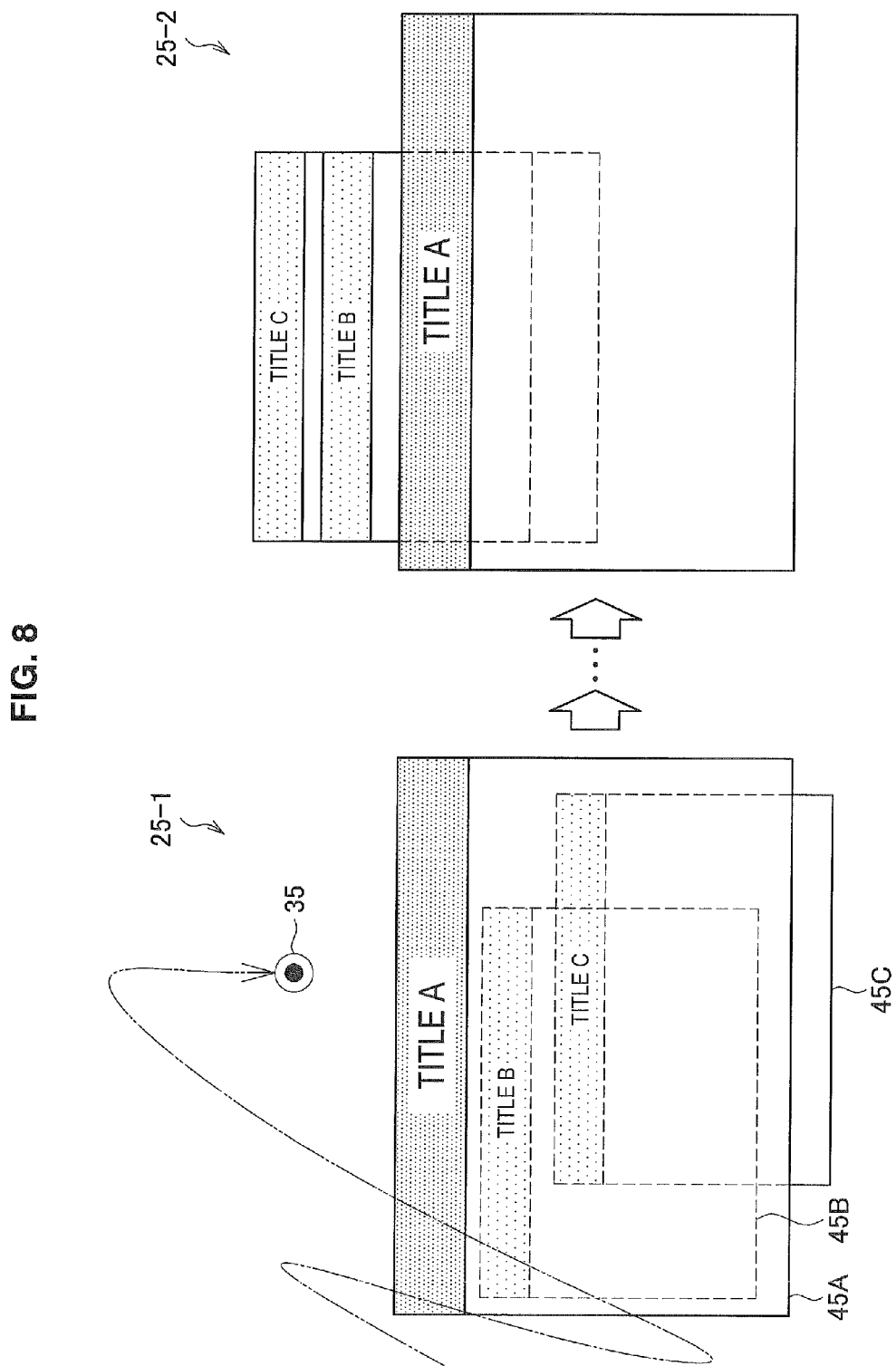

INFORMATION PROCESSING TO VARY SCREEN DISPLAY BASED ON A GAZE POINT OF THE USER

CROSS REFERENCE TO RELATED APPLICATIONS

This application claims the benefit of Japanese Priority Patent Application JP 2013-027673 filed Feb. 15, 2013, the entire contents of which are incorporated herein by reference.

BACKGROUND

The present disclosure relates to an information processing apparatus and a storage medium.

When a user inputs information into an information processing apparatus, the user generally uses devices such as a mouse, a keyboard, and a touch panel that are operated by the user with his/her hand. Meanwhile, a way of inputting information by not a hand but a sound or a line of sight has also been developed.

For example, JP H9-297651A discloses technology for explicitly scrolling or switching pages on the basis of a position of a line of sight on a screen or a direction in which the line of sight moves. The technology enables the pages to be scrolled or switched as if a mouse and a keyboard were used.

JP 2009-54101A discloses technology for explicitly moving a cursor and inputting a letter on the basis of a direction in which a line of sight moves and the blink of an eye. The technology is considered to be used by a physically handicapped user.

SUMMARY

A user usually sees a screen unconsciously, and rarely looks at the screen with an intention to operate the information processing apparatus. However, the technology disclosed in each of H9-297651A and JP 2009-54101A accepts an input on the basis of eye movement, which intends to operate an information processing apparatus, and explicitly varies screen display on the basis of the accepted input. Thus, even when a user unconsciously sees a screen as usual, an input that the user does not intend is accepted and unintended screen display is unfortunately performed.

Accordingly, the present disclosure proposes a novel and improved information processing apparatus and storage medium that can estimate an intention of a user on the basis of a gaze point of the user and implicitly vary screen display on the basis of the estimated intention.

According to an embodiment of the present disclosure, there is provided an information processing apparatus including a detection unit configured to detect a gaze point of a user in a display image displayed on a display unit, an estimation unit configured to estimate an intention of the user based on the gaze point detected by the detection unit, an image generation unit configured to generates a varying image that subtly varies from the display image to a final display image according to the intention estimated by the estimation unit, and a display control unit configured to control the display unit in a manner that the varying image generated by the image generation unit is displayed.

According to another embodiment of the present disclosure, there is provided a non-transitory computer-readable storage medium having a program stored therein, the program causing a computer to execute detecting a gaze point of a user in a display image displayed on a display unit, estimating an intention of the user based on the detected gaze point, generating a varying image that subtly varies from the display image to a final display image according to the estimated intention, and controlling the display unit in a manner that the generated varying image is displayed.

According to one or more of embodiments of the present disclosure, it is possible to estimate an intention of a user on the basis of a gaze point of the user and to implicitly vary screen display on the basis of the estimated intention.

BRIEF DESCRIPTION OF THE DRAWINGS

FIG. 7 is a diagram for describing screen display of a smartphone according to a modified example 3; and FIG. 8 is a diagram for describing screen display of a smartphone according to a modified example 4.

DETAILED DESCRIPTION OF THE EMBODIMENT(S)

Figure 1:
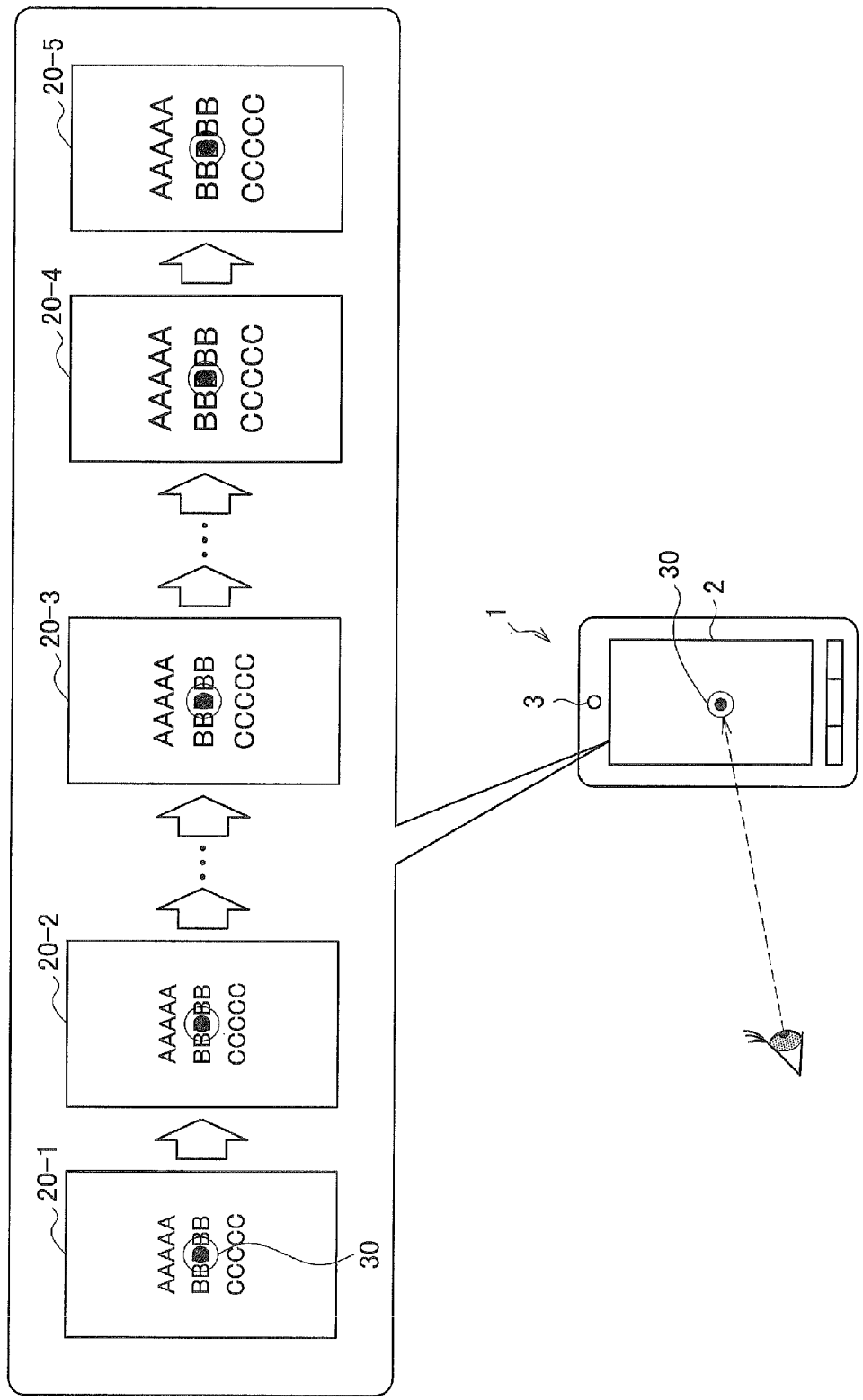
FIG. 1 is a diagram for describing an overview of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of Information Processing Apparatus according to Embodiment of Present Disclosure
2. Embodiment of Present Disclosure
2-1. Structure of Smartphone
2-2. Operational Processing
2-3. Modification
3. Conclusion

1. Overview of Information Processing Apparatus According to Embodiment of Present Disclosure With reference to FIG. 1, an overview of an information processing apparatus according to an embodiment of the present disclosure will be described. FIG. 1 is a diagram for describing the overview of the information processing apparatus according to an embodiment of the present disclosure. As illustrated in FIG. 1, the information processing apparatus according to the present embodiment is realized by a smartphone 1 as an example.

The smartphone 1 includes a display unit 2 and an imaging unit 3, and displays an image for a user with the display unit 2. As illustrated in FIG. 1, the display unit 2 is displaying an image 20-1 including a text part that has multiple lines of letter strings, and a user sees a gaze point 30. The gaze point is a position in the image displayed on the display unit 2, though it is not important whether a user consciously looks at or unconsciously sees the position. The smartphone 1 detects the gaze point 30 from a direction or angle of eye movement of a user on the basis of a captured image obtained by the imaging unit 3 imaging the user seeing the display unit 2.

The user scrolls a screen displayed on the display unit 2 or enlarges a letter that is too small to be read by operating the display unit 2, which has a function of a touch panel, and various buttons with his/her hand for the image displayed on the display unit 2. That is, the smartphone 1 varies an image to be displayed on the display unit 2 in accordance with an operation performed by the user with his/her hand.

It will be here considered that the smartphone 1 varies an image to be displayed on the display unit 2 on the basis of the gaze point 30 in addition to an operation performed by a hand.

As described above, H9-297651A and JP 2009-54101A each disclose the technology for accepting an input on the basis of eye movement, which intends to operate an information processing apparatus, instead of an operation performed by a hand. However, since a user usually sees a screen unconsciously, an input that the user does not intend is unfortunately accepted even in the case where the user unconsciously sees the screen as usual.

With regard to such circumstances, if an information processing apparatus can estimate an intention of a user on the basis of not intentional eye movement of the user but a gaze point of the user, it is possible to prevent an input that the user does not intend from being accepted even in the case where the user unconsciously sees a screen as usual.

The technology disclosed in each of H9-297651A and JP 2009-54101A explicitly varies screen display in accordance with an input accepted on the basis of a line of sight. However, even if an information processing apparatus estimates an intention of a user, an explicit variation in screen display may cause the user to uncomfortably feel that the information processing apparatus is operating without any instruction of the user.

If the information processing apparatus can subtly vary screen display on the basis of the estimated intention, which namely means that the information processing apparatus can vary screen display so implicitly that the user does not notice the variation in screen display, it is possible to prevent the user from having the uncomfortable feeling.

Accordingly, in view of such circumstances, there is provided an information processing apparatus according to an embodiment of the present disclosure. The information processing apparatus according to an embodiment of the present disclosure can estimate an intention of a user on the basis of a gaze point of the user, and implicitly vary screen display on the basis of the estimated intention.

Furthermore, with reference to FIG. 1, an example will be described in which the smartphone 1 estimates a hidden intention of a user that a letter is difficult to read, on the basis of a gaze point unconsciously moved by the user, and implicitly varies display such that the letter becomes easy to read.

Generally speaking, when a letter is too small to be read, a user unconsciously performs an act such as staring at the letter and repeatedly reading portions before and after the letter. Accordingly, when detecting that the gaze point 30 stays at a position of a certain letter for a predetermined time or more or that the gaze point repeatedly comes and goes before and after a certain letter, the smartphone 1 estimates intentions that a user has difficulty in reading the letter and the user would like to make the letter easier to read. The smartphone 1 gradually displays images 20-2 to 20-5 in which a letter size of a text part included in an image 20-1 are so subtly enlarged that the user does not notice the variation in the screen, in accordance with the estimated intentions.

In this way, the smartphone 1 can estimate an intention of a user on the basis of a gaze point even in the case where the user unconsciously sees a screen as usual, and vary screen display in accordance with the estimated intention. Furthermore, since a variation in screen display is so subtle that the user does not notice the variation, it is possible to prevent the user from having an uncomfortable feeling.

The smartphone 1 according to the present embodiment does not request the user to perform any operation with his/her hand, and can enlarge a letter size, as unconsciously intended by the user. That is, while reducing a burden of an operation performed by a user with his/her hand, the smartphone 1 can assist the operation performed by the user with the hand by performing screen display according to an intention of the user.

As above, the overview of the information processing apparatus according to an embodiment of the present disclosure has been described.

Additionally, the smartphone 1 has been used as an example of the information processing apparatus in the illustrated example of FIG. 1. However, the information processing apparatus according to an embodiment of the present disclosure is not limited thereto. For example, the information processing apparatus may also be a head mounted display (HMD), a digital camera, a digital video camera, a personal digital assistant (PDA), a personal computer (PC), a notebook PC, a tablet terminal, a mobile phone terminal, a portable music player, a portable video processing apparatus, or a portable game console.

Since the smartphone 1 has a smaller screen than a screen of a PC and the like, the smartphone 1 may more frequently request an operation such as scrolling and enlargement setting for a letter size than the PC and the like do. Thus, if a line of sight can assist an operation performed by a hand in the smartphone 1 as described above, the operability of the smartphone 1 is improved all the more. Accordingly, an example will be herein described in which the information processing apparatus according to the present embodiment is realized by the smartphone 1.

2. Embodiment of Present Disclosure

[2-1. Structure of Smartphone]

Figure 2:
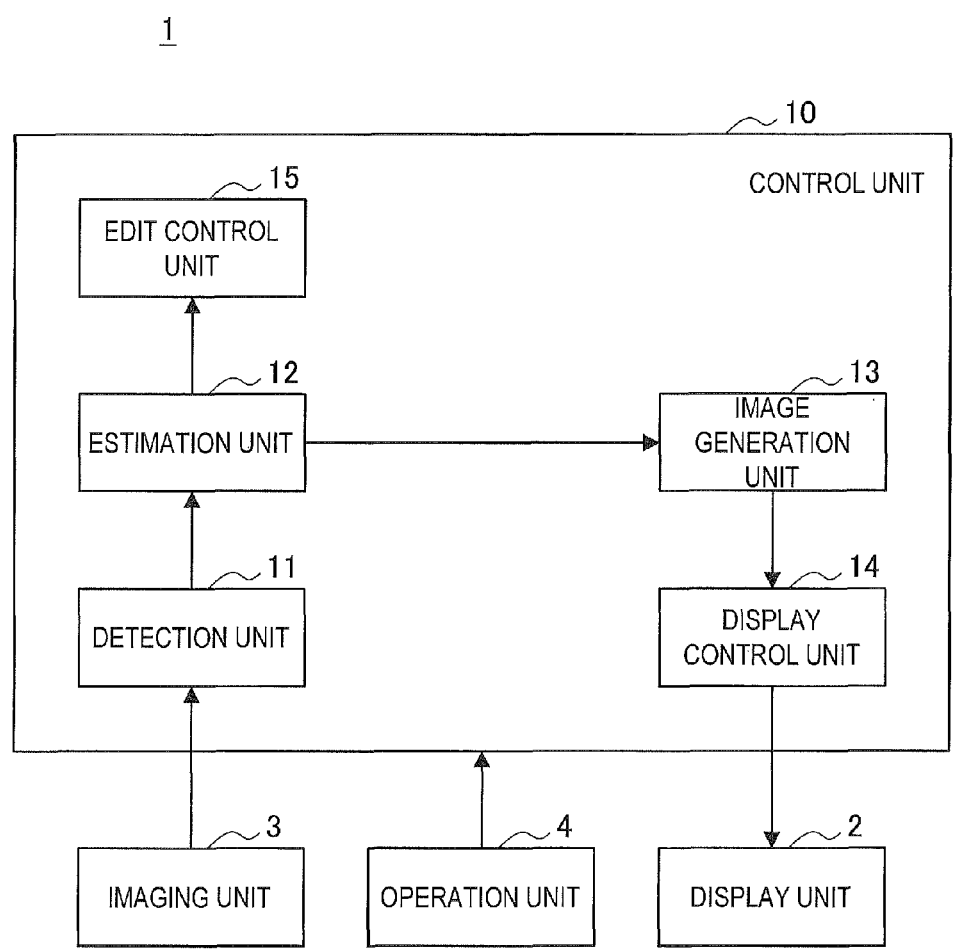
FIG. 2 is a block diagram illustrating a structure of a smartphone according to an embodiment of the present disclosure.

First of all, with reference to FIG. 2, a structure of the smartphone 1 according to the present embodiment will be described. FIG. 2 is a block diagram illustrating the structure of the smartphone 1 according to an embodiment of the present disclosure. As illustrated in FIG. 2, the smartphone 1 includes a display unit 2, an imaging unit 3, an operation unit 4, and a control unit 10. Each structural element of the smartphone 1 will be described below in detail.

(Display Unit)

The display unit 2 displays image data (still image data/moving image data) that is output from the control unit 10. The display unit 2 varies an image to be displayed, on the basis of control of a display control unit 14, which will be described below. In addition, the display unit 2 varies an image to be displayed, in accordance with a user input accepted by the operation unit 4, which will also be described below. The display unit 2 is realized, for example, by a liquid crystal display (LCD) or an organic light-emitting diode (OLED).

(Imaging Unit)

The imaging unit 3 includes an image sensor, imaging optics that include an imaging lens, and a photographed image signal processing unit, and outputs data of a photographed image in the form of a digital signal. Additionally, the image sensor is realized, for example, by a charge coupled device (CCD) imager or a complementary metal oxide semiconductor (CMOS) imager. The imaging unit 3 according to the present embodiment images a user seeing the display unit 2, and transmits the captured image to a detection unit 11.

(Operation Unit)

The operation unit 4 has a function of accepting an input from a user. For example, the operation unit 4 is realized by a touch panel integrated with the display unit 2, a button, and a microphone for an audio input. The operation unit 4 accepts an input of an instruction for a letter input to an active window, scrolling, enlargement/reduction of a letter size. In addition, if the smartphone 1 adopts a multi-window system, the operation unit 4 may accept a selection instruction indicating which window is activated as an editable area.

The multi-window system is herein a system in which multiple work areas called windows are displayed at the same time, and different display is performed for an application in each window. The display unit 2 may display a screen including multiple windows as a display image included in a screen of the multi-window system. A window that is selected by a user from the multiple windows displayed on the display unit 2 so as to be activated is referred to as an active window, and is set as an editable area by an input from the user to the operation unit 4. Accordingly, when the operation unit 4 accepts an input of an instruction for scrolling or enlargement/reduction of a letter size, display of the active window scrolls and a letter size of a text part in the active window is enlarged/reduced. When multiple windows are being displayed on the display unit 2, an active window is displayed in the foreground (forefront), and distinguishable from another window that is not active because a bar part called a title bar at the top of the window is displayed in a darker color, or the like.

(Control Unit)

The control unit 10 functions as a processing device and a control device, and controls the entire operation of the smartphone 1 in accordance with various programs. The control unit 10 is realized, for example, by a central processing unit (CPU) or a microprocessor. Additionally, the control unit 10 may also include read only memory (ROM) configured to store a program and an operation parameter that are used, and random access memory (RAM) configured to temporarily store a parameter that changes as necessary.

The control unit 10 according to the present embodiment detects a gaze point from a captured image of a user that is imaged by the imaging unit 3, estimates an intention of the user on the basis of the detected gaze point, and varies an image to be displayed on the display unit 2 in accordance with the estimated intention. The control unit 10 also functions as the detection unit 11, an estimation unit 12, an image generation unit 13, the display control unit 14, and an edit control unit 15.

Detection Unit

The detection unit 11 detects a gaze point of a user in a display image displayed on the display unit 2. More specifically, the detection unit 11 performs image recognition on a captured image that is output from the imaging unit 3, and detects a gaze point on the basis of a direction or angle of eye movement of a user included in the captured image. The detection unit 11 outputs information indicating the detected gaze point to the estimation unit 12.

Estimation Unit

The estimation unit 12 estimates an intention of the user on the basis of the gaze point of the user detected by the detection unit 11. For example, as described above with reference to FIG. 1, when a gaze point stays at a position of a certain letter displayed on the display unit 2 for a predetermined time or more or when the gaze point repeatedly comes and goes before and after a certain letter, the estimation unit 12 estimates an intention of a user that the user would like to make the letter easier to read.

In addition, the estimation unit 12 may estimate an amount and direction of scrolling intended by a user on the basis of a changing speed and direction of a position of a gaze point. More specifically, when a position of a gaze point changes fast along a letter string displayed on the display unit 2, the estimation unit 12 estimates intentions that the user reads letters fast and the user would like to scroll the screen widely in the direction in which the sentences continue. To the contrary, when a position of a gaze point slowly changes along a letter string displayed on the display unit 2, the estimation unit 12 estimates intentions that the user slowly reads letters and the user would like to scroll the screen narrowly in the direction in which the sentences continue.

Additionally, when a position of a gaze point changes fast along a letter string displayed on the display unit 2, the estimation unit 12 may estimate an intention of a user that the number of letters displayed in a single screen is too small, which namely means that the user would like to reduce a letter size and to increase the number of letters displayed in a single screen.

If the display unit 2 displays a display image included in a screen of the multi-window system, the estimation unit 12 may also estimate an intention of a user on the basis of a position of a window included in the display image and a gaze point. For example, when multiple windows are displayed on the display unit 2 and a gaze point stays on a window that is not active for a predetermined time or more, the estimation unit 12 estimates an intention that the user would like to activate the window on which the gaze point is positioned.

The estimation unit 12 outputs information indicating the estimated intention of the user to the image generation unit 13 and the edit control unit 15.

Image Generation Unit

The image generation unit 13 generates a varying image that subtly varies from the display image being currently displayed on the display unit 2 to a final display image according to the intention of the user estimated by the estimation unit 12. The final display image is an image that satisfies the intention of the user for the display image being currently displayed on the display unit 2. For example, if the estimation unit 12 estimates an intention of a user that the user would like to make a letter easier to read, the final display image is an image in which readability of a text part included in the display image is enhanced to such an extent that the user does not have difficulty in reading. Additionally, the final display image may also be an image in which visual recognizability is enhanced to such an extent that a user does not have difficulty in reading. First of all, the image generation unit 13 sets a final display image, and then the image generation unit 13 generates a varying image in which readability of a text part included in the display image is enhanced to the set final display image. For example, the image generation unit 13 generates a varying image in which readability of a text part is enhanced through at least one of enlargement of a letter size, enhancement of resolution, enhancement of contrast with a background image, and edge enhancement. In addition, the image generation unit 13 may enhance readability of a text part by changing a font, boldfacing a letter, enhancing luminance, or the like. As an example, let us assume below that a final display image is an image in which a letter size is enlarged to such an extent that a user does not have difficulty in reading, and processing performed by the image generation unit 13 will be described.

First of all, the image generation unit 13 calculates an enlargement ratio of a letter size for enlarging a display image being currently displayed on the display unit 2 up to the final display image. The enlargement ratio may have a predetermined value or a value obtained by performing back calculation such that the letter size is enlarged to a predetermined letter size. In addition, the image generation unit 13 may calculate an enlargement ratio on the basis of a distance between an eye of a user and the display unit 2. When the face of a user approaches the display unit 2, the image generation unit 13 may also calculate an enlargement ratio on the basis of a degree of a change in the distance between an eye of the user and the display unit 2, the changing speed, or the like. Since a shortsighted person takes an object close to the eyes and a farsighted person or a presbyope takes an object away from the eyes, the image generation unit 13 may reduce the display image when the face of the user approaches the display unit 2, while the image generation unit 13 may enlarge the display image when the face of the user moves away from the display unit 2.

The image generation unit 13 generates a varying image that is subtly enlarged from the display image being displayed on the display unit 2 to a final display image, namely to the calculated enlargement ratio. If a difference between the display image and the final display image is subtle, which namely means that an enlargement ratio is small, the image generation unit 13 may generate a single varying image. To the contrary, if the enlargement ratio is not small, the image generation unit 13 may generate multiple varying images that are different from each other by a predetermined proportion. For example, if the enlargement ratio is 200%, the image generation unit 13 generates images enlarged by 101%, enlarged by 102%, . . . , enlarged by 199%, and enlarged by 200%, which means multiple images that are different from each other by 1%.

In this way, when the estimation unit 12 estimates an intention of the user that the user would like to make the letter easier to read, the image generation unit 13 generates one or more varying images for linking the display image with the final display image, in which readability of a text part included in the display image is enhanced with a subtle variation. The variation is so subtle that the smartphone 1 can prevent the user from having an uncomfortable feeling when the varying images are displayed on the display unit 2.

The estimation unit 12 may also estimate, for example, an amount and direction of scrolling intended by the user in addition to the above-described intention that the user would like to make the letter easier to read. In this case, the final display image is an image in which the text part included in the display image by the amount intended by the user in the direction intended by the user. The image generation unit 13 generates one or more varying images that are gradually scrolled from the display image being displayed on the display unit 2 to the final display image, namely to the estimated amount of scrolling, with a subtle variation.

In addition, the estimation unit 12 may estimate an intention of the user that the user would like to activate a window on which a gaze point is positioned. In this case, the final display image is an image in which the window on which the gaze point is positioned is activated as an active window. The image generation unit 13 generates one or more varying images in which the window is gradually activated from the display image being displayed on the display unit 2 to the final display image, namely to the image in which the window on which the gaze point is positioned is activated, with a subtle variation. For example, the image generation unit 13 generates one or more varying images in which an overlapping part of windows subtly varies such that a current active window is displayed in a lighter color and a window on which a gaze point is positioned is displayed in the foreground. Additionally, the varying images may also vary gently with the above-described variation such that a title bar of the current active window is displayed in a lighter color and a title bar of the window on which the gaze point is positioned is displayed in a darker color.

The image generation unit 13 may also generates a varying image in which an area at or near the gaze point in the display image varies. For example, when a user stares at a certain letter, the image generation unit 13 generates a varying image in which readability of portions before and after the letter, a letter string including the letter, or several lines before and after the letter is enhanced as an area at or near the letter. In this way, the image generation unit 13 allows the user to comfortably read by accurately enhancing readability of a portion that the user has difficulty in reading.

To the contrary, the image generation unit 13 may also generate a varying image in which an area far from the gaze point in the display image varies. For example, when a user stares at a certain letter, the image generation unit 13 generates a varying image in which readability of letters is enhanced in a portion several lines after the letter or several lines after the letter string including the letter as an area far from the letter. In this way, since the area far from the gaze point is varied, the image generation unit 13 can prevent the user from recognizing a variation in screen display and having an uncomfortable feeling.

The image generation unit 13 outputs the varying image generated in this way to the display control unit 14.

Display Control Unit

The display control unit 14 controls the display unit 2 such that a varying image generated by the image generation unit 13 is displayed. If multiple varying images are generated by the image generation unit 13, the display control unit 14 controls the display unit 2 such that the multiple varying images are gradually switched and displayed at predetermined intervals. For example, in the illustrated example of FIG. 1, the display control unit 14 controls the display unit 2 such that the images 20-2 to 20-5 generated by the image generation unit 13 are switched and displayed at intervals of at least 0.1 seconds or more.

When a window is activated in the multi-window system, it is necessary to perform display control such as displaying the active window in the foreground and edit control such as activating the window as an editable area. The display control unit 14 performs display control while edit control is performed by the edit control unit 15, which will be described below.

Edit Control Unit

When the display unit 2 displays a display image included in a screen of the multi-window system, the edit control unit 15 controls whether to activate a window included in the display image as an editable area. For example, when the estimation unit 12 estimates an intention of a user that the user would like to activate a window on which a gaze point is positioned, the edit control unit 15 activates the window. That is, the edit control unit 15 switches the editable area from the current active window to the window on which the gaze point is positioned. The edit control unit may also switch the editable area to the window at timing when the window on which the gaze point is positioned is displayed in the foreground, under the control of the display control unit 14. In addition, the edit control unit 15 may switch the editable area at timing when a title bar of the window on which the gaze point is positioned is displayed in a darker color than a window that is the last active window.

(Supplemental Remarks)

It has been described above that the image generation unit 13 generates varying images different from each other by a predetermined proportion, and the display control unit 14 switches and displays the varying images at intervals of a predetermined time. However, various values are conceivable as parameters such as a varying proportion and a switching interval. As an example, the parameter disclosed in "Tetsuo Ishikawa, and Ken Mogi, "Visual one-shot learning as an 'anti-camouflage device': a NOvel morphing paradigm," Cognitive Neurodynamics, September 2011, Volume 5, Issue 3, pp. 231 to 239," which is a literature regarding learning experience on a hidden figure, may be applied to the present embodiment. In the literature, an experiment is conducted in which people observe a variation situation in which an initial image gently varies to a final image, and a time is measured that is elapsed until they can recognize what the final image is. The literature discloses that it may be difficult to recognize what the final image is if the initial image is varied to the final image by 1% every 0.2 seconds. That is, it is suggested that if the initial image is varied to the final image by 1% every 0.2 seconds, a user is unlikely to notice the variation. Accordingly, in the present embodiment, the image generation unit 13 generates varying images different from each other by 1%, and the display control unit 14 controls the display unit 2 such that the display image being currently displayed is switched to the varying image that is varied by 1% from the display image being currently displayed at intervals of at least 0.2 seconds or more. Additionally, the literature does not define 0.2 seconds as a minimum value. 0.2 seconds are just a value adopted in the experiment in which subjects consciously attempt to identify the hidden figure. Accordingly, intervals of 0.1 seconds, which are shorter than the intervals of 0.2 seconds, may also be adopted in the present embodiment, in which a user unconsciously sees a screen. If the image generation unit 13 generates a varying image in which an area far from a gaze point in a display image varies, the area may also vary more boldly because the user is unlikely to notice the variation in screen display. For example, the smartphone 1 may also vary varying images by 1% every 0.01 seconds.

The smartphone 1 may also perform face recognition on a facial area included in a captured image imaged by the imaging unit 3, identify whether a user has been registered, and alter a varying image to be displayed, on the basis of the identification result. For example, the smartphone 1 may vary display for another user who is not a user that is registered as an owner of the smartphone 1 such that the varied display is against an intention of the other user.

Specifically, the detection unit 11 detects a gaze point of another user in a display image, and the estimation unit 12 estimates an intention of the other user on the basis of the gaze point of the other user detected by the detection unit 11. For example, when a gaze point of another user moves along a letter string displayed on the display unit 2, the estimation unit 12 estimates an intention of the other user that the other user would like to read the letter string displayed on the display unit 2. The image generation unit 13 generates a varying image that subtly varies to a final display image which is against the intention of the other user estimated by the estimation unit 12, and the display control unit 14 displays the generated varying image on the display unit 2. For example, the image generation unit 13 generates varying images in which readability of the letter string displayed on the display unit 2 is gently lowered such that the letter string becomes difficult to read against the intention of the other user that the other user would like to read the letter string, and the display control unit 14 displays the generated varying images. In this way, the smartphone 1 can prevent the other user from unjustly viewing the displayed contents.

As above, the structure of the smartphone 1 according to the present embodiment has been described.

[2-2. Operational Processing]

Figure 3:
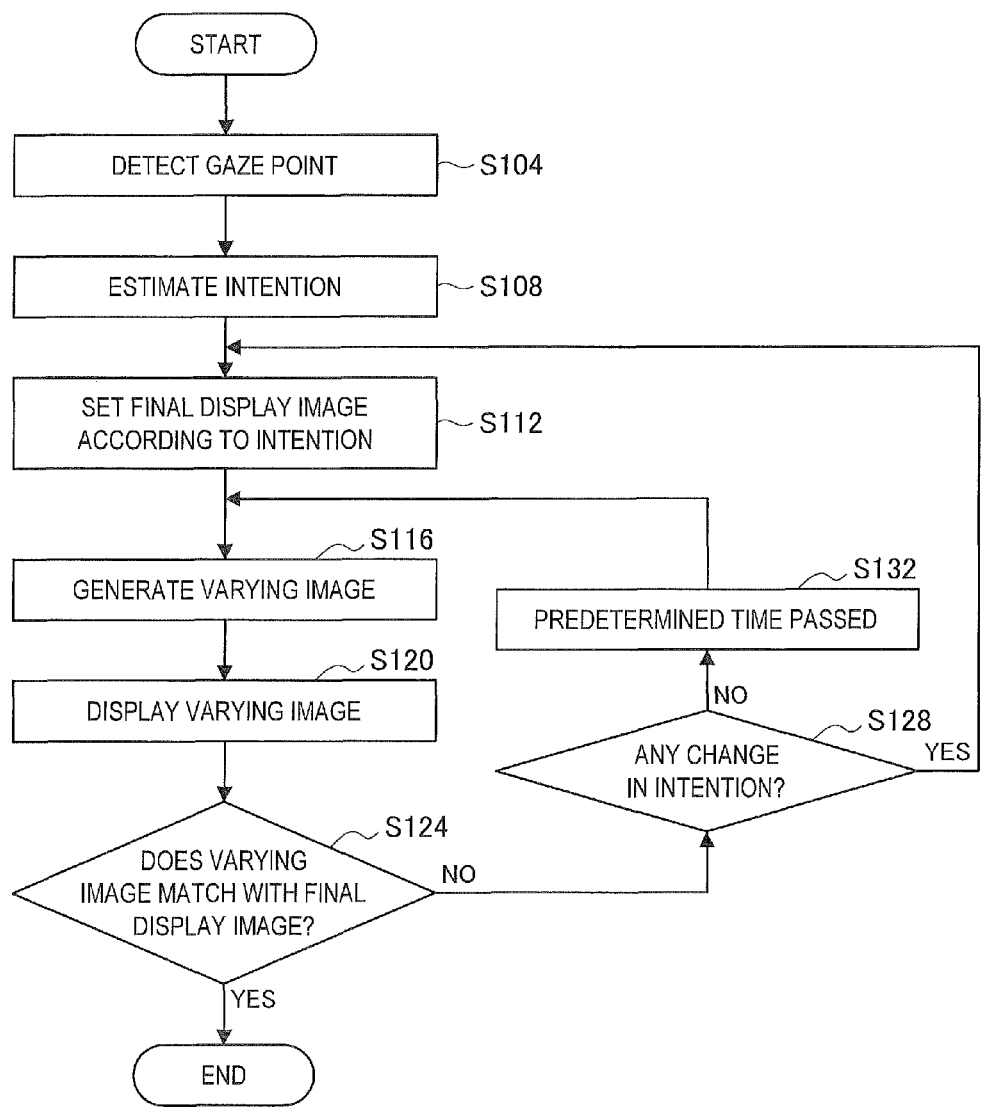
FIG. 3 is a flowchart illustrating an operation of a smartphone according to an embodiment of the present disclosure.

Next, with reference to FIGS. 3 to 4, operational processing of the smartphone 1 according to the present embodiment will be described. FIG. 3 is a flowchart illustrating an operation of the smartphone 1 according to an embodiment of the present disclosure.

As illustrated in FIG. 3, first, in step S104, the detection unit 11 performs image recognition on a captured image that is output from the imaging unit 3, and detects a gaze point on the basis of a direction or angle of eye movement of a user included in the captured image. Here, with reference to FIG. 4, a specific example of a gaze point of a user detected by the detection unit 11 will be described. FIG. 4 is a diagram for describing screen display of the smartphone 1 according to an embodiment of the present disclosure. As illustrated in FIG. 4, the display unit 2 is currently displaying a display image 21 including a text part that has multiple lines of letter strings, and a gaze point 31 of a user is positioned on the display image 21.

Next, in step S108, the estimation unit 12 estimates an intention of the user on the basis of the gaze point of the user detected by the detection unit 11. For example, in the illustrated example of FIG. 4, when the gaze point 31 stays at a position of a certain letter for a predetermined time or more, the estimation unit 12 estimates intentions that the user has difficulty in reading the letter, and the user would like to make the letter easier to read.

Subsequently, in step S112, the image generation unit 13 sets a final display image according to the intention of the user estimated by the estimation unit 12. Variable images are conceivable as the final display image that is set by the image generation unit 13. For example, in the illustrated example of FIG. 4, the image generation unit 13 may set an image 21A, 21B, 21C, or 21D in which readability is enhanced to such an extent that the user does not have difficulty in reading, as the final display image.

The image 21A is an image in which a letter size of the entire text part included in the display image 21 is enlarged, in the same way as the example described above with reference to FIG. 1. The image 21B is an image in which a letter string at a position of the gaze point 31 in the text part included in the display image 21 is boldfaced. The image 21C is an image in which a letter size of the letter string at the position of the gaze point 31 in the text part included in the display image 21 is enlarged. The image 21D is an image in which a letter size of letters after the letter at the position of the gaze point 31 in the text part included in the display image 21 is gently enlarged with increase in a distance from the letter on which the gaze point 31 is positioned.

In the subsequent step, the display control unit 14 controls the display unit 2 such that multiple varying images generated by the image generation unit 13 are gradually switched and displayed at predetermined intervals. More specifically, the display control unit 14 controls the display unit 2 such that an image being currently displayed on the display unit 2 is switched to the varying image that varies by 1% from the image being currently displayed on the display unit 2 so as to be closer to the final display image, and displayed at an interval of at least 0.2 seconds or more.

First of all, in step S116, the image generation unit 13 generates varying images in which readability of the text part included in the display image 21 is subtly enhanced so as to be closer to the set final display image. For example, in the illustrated example of FIG. 4, the image generation unit 13 generates varying images that link the display image 21 with the image 21A, 21B, 21C, or 21D, which is set as the final display image, and that vary from the display image 21 so as to be closer to the final display image by 1%.

Additionally, readability of both a letter at or near the gaze point 31 and a letter far from the gaze point 31 is enhanced in the image 21A. Accordingly, when the image 21A is set as a final display image, the image generation unit 13 generates varying images in which both an area at or near the gaze point 31 and an area far from the gaze point 31 are varied. Meanwhile, readability of a letter string at a position of the gaze point 31 is enhanced in the images 21B and 21C. Accordingly, when the image 21B or 21C is set as a final display image, the image generation unit 13 generates varying images in which an area at or near the gaze point 31 is varied. Furthermore, readability of a letter far from the letter at the position of the gaze point 31 is enhanced in the image 21D. Accordingly, when the image 21D is set as a final display image, the image generation unit 13 generates varying images in which an area far from the gaze point 31 is varied.

Next, in step S120, the display control unit 14 controls the display unit 2 such that an image to be displayed on the display unit 2 is switched from the display image 21 to the varying image generated by the image generation unit 13, which varies from the display image 21 so as to be closer to the final display image by 1%.

Next, in step S124, the display control unit 14 determines whether the varying image displayed on the display unit 2 matches with the final display image that is set by the image generation unit 13.

If the varying image being currently displayed on the display unit 2 matches with the final display image (S124/YES), the processing ends. To the contrary, if the varying image being currently displayed on the display unit 2 does not match with the final display image (S124/NO), the image generation unit 13 determines, in step S128, whether there is a change in the intention of the user estimated by the estimation unit 12. That is, in step S128, the same processing described for steps S104 and S105 is performed, and the image generation unit 13 determines whether there is a change between the intention of the user estimated at the previous time and the intention of the user estimated at the current time.

If there is a change in the intention of the user (S128/YES), the processing returns to step S112 again and the image generation unit 13 sets again a final display image according to the changed intention of the user. In this way, the smartphone 1 determines the intention of the user in step S128 as necessary. If there is a change, the smartphone 1 can flexibly vary display in accordance with the changed intention of the user by updating the final display image in accordance with the changed intention.

For example, when the estimation unit 12 estimates an intention of a user that the user would like to make a letter easier to read and the display control unit 14 displays, on the display unit 2, varying images in which a letter size is gently enlarged, a letter size that is easy for the user to read may be obtained before the varying images are varied to the final display image. In this case, since the user stops staring and starts to read the next sentences, the estimation unit 12 may estimate an intention that the user would like to scroll the screen in the direction in which the sentences continue. The image generation unit 13 sets again a final display image in which the screen is scrolled in the direction intended by the user, while the display control unit 14 stops displaying the varying images in which a letter size is enlarged, and can display, on the display unit 2, varying images that gently scroll, instead.

To the contrary, if there is no change in the intention of the user (S128/NO), the display control unit 14 waits for a predetermined time (at least 0.2 seconds or more) in step S132, and then repeats steps S116 to S124.

In step S116, the image generation unit 13 generates, from the varying image being currently displayed on the display unit 2, a varying image that is further closer to the final display image by 1%. Subsequently, in step S120, the display control unit 14 controls the display unit 2 such that an image to be displayed on the display unit 2 is switched from the varying image displayed at the previous time to the varying image that is further closer to the final display image by 1%.

As described above, the smartphone 1 according to the present embodiment can gently enhance readability of a text part included in a display image on the basis of a gaze point of a user. A variation in screen display for enhancement of readability is so subtle that a user does not notice the variation. Accordingly, it is possible to prevent the user from having an uncomfortable feeling.

As above, the operation of the smartphone 1 according to an embodiment of the present disclosure has been described.

[2-3. Modification]

The smartphone 1 according to an embodiment of the present disclosure may not only enhance readability of a text part, as described above, but also display various varying images. Next, with reference to FIGS. 5 to 8, an example of the varying images displayed by the smartphone 1 will be described.

Modified Example 1: Scrolling

Figure 5:
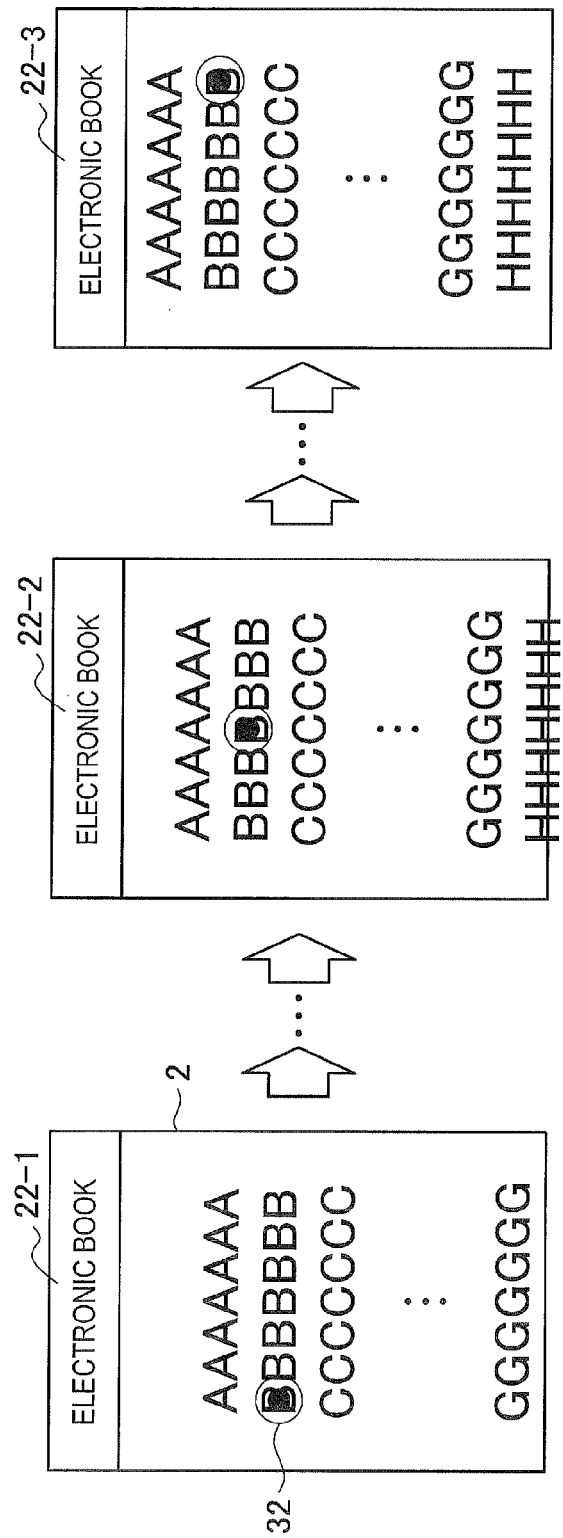
FIG. 5 is a diagram for describing screen display of a smartphone according to a modified example 1.

The smartphone 1 according to the present modification can display varying images that gently scroll. With reference to FIG. 5, the smartphone 1 according to the present modification will be described below.

FIG. 5 is a diagram for describing screen display of the smartphone 1 according to a modified example 1. As illustrated in FIG. 5, the display unit 2 is currently displaying a display image 22-1 including a text part that has multiple lines of letter strings, and a gaze point 32 of a user is positioned on the display image 22-1. Operational processing for the smartphone 1 to display varying images that gently scroll will be described below along the flowchart illustrated in FIG. 3.

Figure 4:
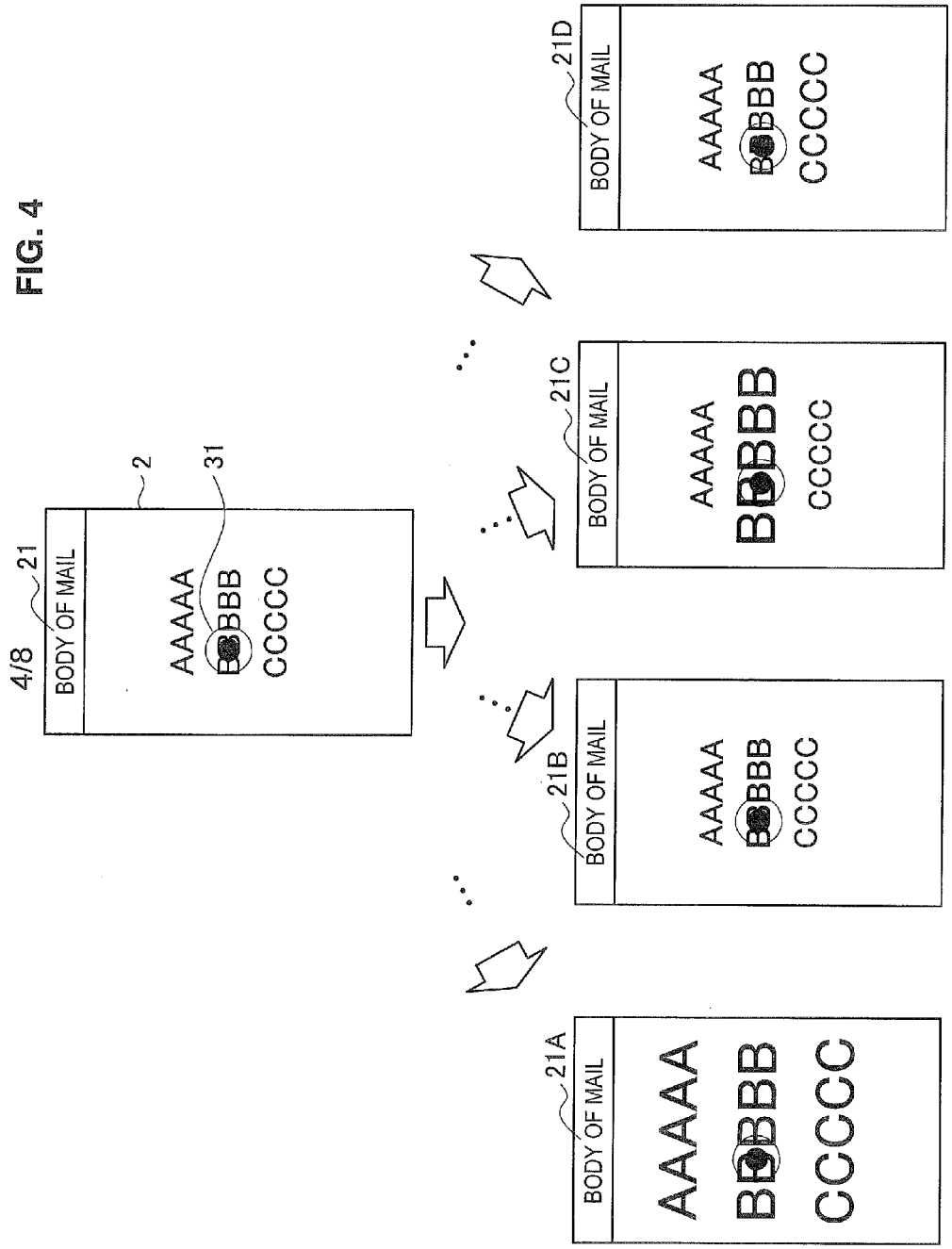
FIG. 4 is a diagram for describing screen display of a smartphone according to an embodiment of the present disclosure.

First of all, as illustrated in FIG. 3, the detection unit 11 detects, in step S104, the gaze point 32 illustrated in FIG. 4.

Next, in step S108, the estimation unit 12 estimates an amount and direction of scrolling intended by a user, on the basis of the gaze point 32. For example, the estimation unit 12 estimates an amount and direction of scrolling intended by a user, on the basis of a difference between a position of a gaze point at the previous time and a position of the gaze point 32 at the current time.

Subsequently, in step S112, the image generation unit 13 sets, as a final display image, an image in which a text part included in the display image 22-1 scrolls by the amount intended by the user in the direction intended by the user. For example, the image generation unit 13 sets, as a final display image, an image 22-3 in which a text part included in the display image 22-1 scrolls by an amount of a line in the downward direction of the screen.

In the subsequent step, the display control unit 14 controls the display unit 2 such that varying images that scroll by 1% per varying image from the display image 22-1 being currently displayed on the display unit 2 in the downward direction of the screen so as to be closer to the final display image 22-3 are displayed at predetermined intervals. A varying image 22-2 illustrated in FIG. 5 represents an example of a varying image that is displayed on the display unit 2 while the display image 22-1 are varying to the final display image 22-3.

Since the upper end of the text part disappears from the screen and a new letter string appears from the bottom while scrolling is performed, it can be said that an area far from the gaze point 32 is varying in the varying images.

As above, the smartphone 1 according to the modified example 1 has been described.

Modified Example 2: Switching Active Window

The smartphone 1 according to the present modification can gently switch an active window. Next, with reference to FIG. 6, the smartphone 1 according to the present modification will be described.

Figure 6:
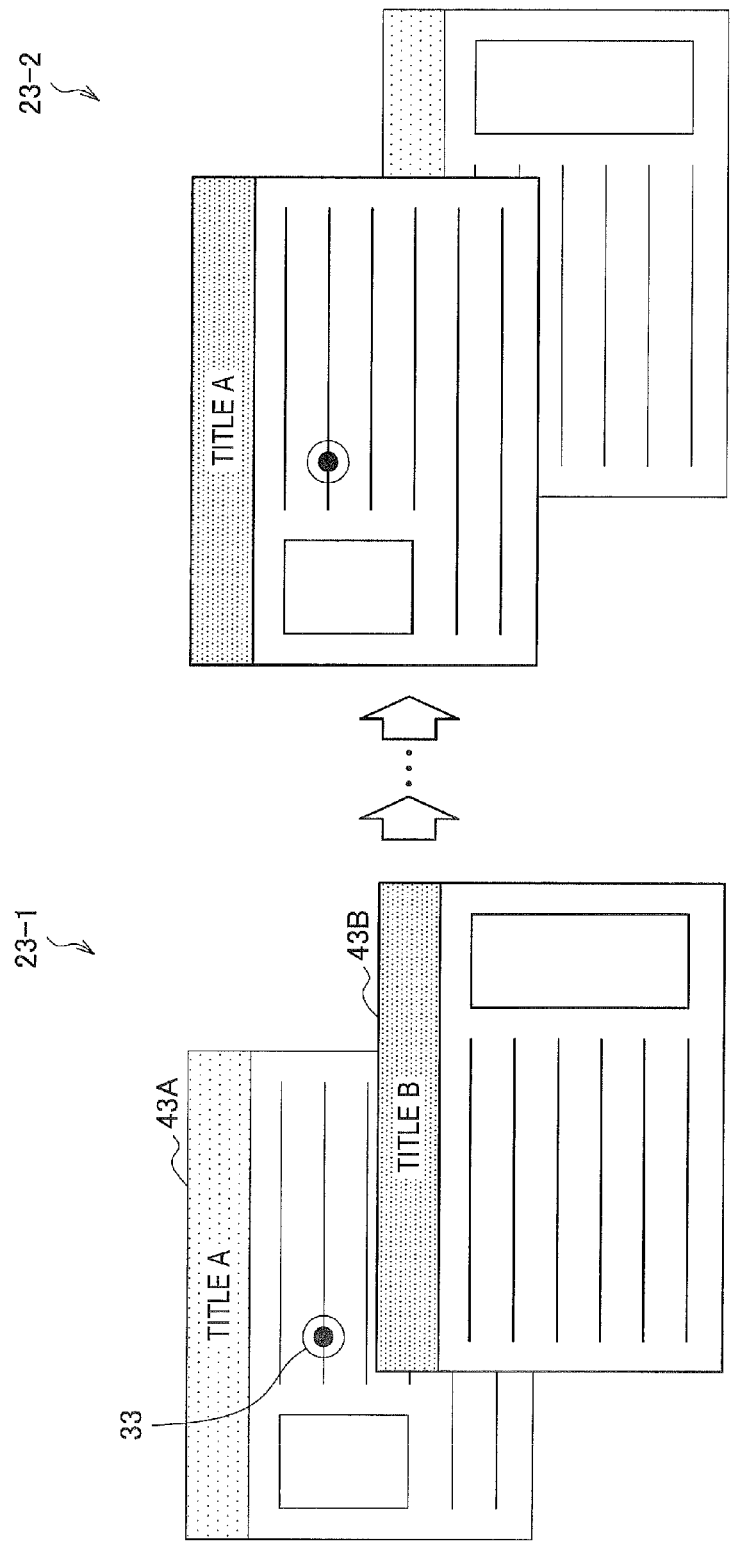
FIG. 6 is a diagram for describing screen display of a smartphone according to a modified example 2.

FIG. 6 is a diagram for describing screen display of the smartphone 1 according to a modified example 2. As illustrated in FIG. 6, the display unit 2 is currently displaying a display image 23-1 that includes a window 43A and a window 43B and is included in a screen of the multi-window system. A gaze point 33 of a user is positioned on the display image 23-1. Here, an active window is the window 43B, and the gaze point 33 is at a position of the window 43A that is not active. Operational processing for the smartphone 1 to gently switch the active window will be described below along the flowchart illustrated in FIG. 3.

First of all, as illustrated in FIG. 3, the detection unit 11 detects, in step S104, the gaze point 33 illustrated in FIG. 6.

Next, in step S108, the estimation unit 12 estimates an intention of a user that the user would like to activate the window 43A on which the gaze point 33 is positioned, on the basis of the gaze point 33. For example, when the gaze point stays at the position of the window 43A that is not active for a predetermined time or more, the estimation unit 12 estimates an intention of the user that the user would like to activate the window 43A.

Subsequently, in step S112, the image generation unit 13 sets, as a final display image, an image 23-2 in which the window 43A on which the gaze point 33 is positioned in the display image 23-1 is activated as an active window. Since the active window is the window 43B in the display image 23-1 being currently displayed on the display unit 2, the window 43B is displayed in the foreground and a title bar thereof is displayed in a dark color. Meanwhile, since the active window is the window 43A in the final display image 23-2, the window 43A is displayed in the foreground and a title bar thereof is displayed in a dark color.

In the next step, the display control unit 14 controls the display unit 2 such that varying images in which the window 43A is activated by 1% per varying image from the display image 23-1 being currently displayed on the display unit 2 so as to be closer to the final display image 23-2 are displayed at predetermined intervals. The edit control unit 15 may switch an editable area from the window 43B to the window 43A at timing when the window 43A is, for example, displayed in the foreground while the display image 23-1 is varying to the final display image 23-2.

When the active window is switched, the gaze point 33 is positioned on a part at which the windows do not overlap and only a part at which the windows overlap varies. Accordingly, it can be said that an area far from the gaze point 33 varies in the varying images.

As above, the smartphone 1 according to the modified example 2 has been described.

Modified Example 3: Display Control on Window that is Not Active

The smartphone 1 according to the present modification can control display of a window that is not active without switching an active window. In the present modification, an example will be described in which the smartphone 1 enhances, on the basis of a gaze point, readability of a text part in a window that is not active. However, other display control such as scrolling may also be performed. Next, with reference to FIG. 7, the smartphone 1 according to the present modification will be described.

FIG. 7 is a diagram for describing screen display of the smartphone 1 according to a modified example 3. As illustrated in FIG. 7, the display unit 2 is currently displaying a display image 24-1 that includes a window 44A and a window 44B and is included in a screen of the multi-window system. A gaze point 34 of a user is positioned on the display image 24-1. Here, an active window is the window 44B, and the gaze point 34 is at a position of the window 44A that is not active. Operational processing for the smartphone 1 to gently vary display of a window that is not active without switching the active window will be described below along the flowchart illustrated in FIG. 3.

First of all, as illustrated in FIG. 3, the detection unit 11 detects, in step S104, the gaze point 34 illustrated in FIG. 7.

Next, in step S108, the estimation unit 12 estimates an intention of the user on the basis of the gaze point 34. For example, when the gaze point 34 stays at a position of a certain letter for a predetermined time or more, the estimation unit 12 estimates intentions that the user has difficulty in reading the letter and the user would like to make the letter easier to read.

Subsequently, in step S112, the image generation unit 13 sets, as a final display image, an image 24-2 in which a letter size of a letter string on which the gaze point 34 is positioned in a text part included in the window 44A is enlarged, in accordance with the intention that the user would like to make the letter easier to read.

In the next step, the display control unit 14 controls the display unit 2 such that varying images are displayed in which the letter size of the text part included in the window 44A is enlarged by 1% per varying image from the display image 24-1 being currently displayed on the display unit 2 so as to be closer to the final display image 24-2. The image generation unit 13 does not generate varying images in which the window 44A is displayed in the foreground as an active window. The edit control unit 15 does not also perform control such that an editable area is switched from the window 44B to the window 44A. The smartphone 1 can therefore enhance readability of a text part in a window that is not active without switching the active window.

Additionally, it can be said in the example that an area at or near the gaze point 34 varies in the varying images because the letter size of the letter string at the position of the gaze point 34 is enlarged.

As above, the smartphone 1 according to the modified example 3 has been described.

(Supplemental Remarks)

The processing according to the modified example 2 and the processing according to the modified example 3 are different from each other in that when a user sees a window that is not active, an active window is switched or only display control is performed without switching an active window. Here, the smartphone 1 can use both processing by switching the processing according to the modified example 2 and the processing according to the modified example 3 on the basis of a gaze point of a user.

For example, let us assume that the smartphone 1 usually performs the processing according to the modified example 2, in which an active window is switched when a user sees a window that is not active. Upon estimating an intention that the processing is switched to the processing according to the modified example 3, the smartphone 1 switches the processing according to the modified example 2 to the processing according to the modified example 3. That is, the smartphone 1 continuously activates the current active window.

Specifically, when a gaze point is positioned in a predetermined area of a window that is currently active for a predetermined time, the estimation unit 12 estimates, as an intention of a user, that the window is continuously activated. For example, when a user is staring at a title bar of an active window for several seconds, the estimation unit 12 estimates, as an intention of the user, that the active window continues to be an active window.

The edit control unit 15 continuously activates the window until a predetermined instruction is issued. For example, until the user has been staring at the title bar of the active window again for several seconds, or until the operation unit 4 accepts a selection instruction of an active window, the edit control unit 15 continuously keeps the active window as an active window.

Consequently, even if the user is seeing a window that is not active for a predetermined time or more, the active window does not switched. The smartphone 1 can perform the processing according to the modified example 3, in which only display control is performed on a window that is not active.

Meanwhile, if the user is staring at the tile bar of the active window again for several seconds, or if the operation unit 4 accepts a selection instruction of an active window, the continuous activation of the active window is cancelled. That is, the smartphone 1 performs the processing according to the modified example 2, in which the active window is switched when a user sees a window that is not active.

In this way, the smartphone 1 can use both the processing according to the modified example 2 and the processing according to the modified example 3.

Modified Example 4: Search for Window

When a window overlaps with another window and is hidden, the smartphone 1 according to the present modification can distinguishably display a part of each window by moving a position of the hidden window. Next, with reference to FIG. 8, the smartphone 1 according to the present modification will be described.

FIG. 8 is a diagram for describing screen display of the smartphone 1 according to a modified example 4. As illustrated in FIG. 8, the display unit 2 is currently displaying a display image 25-1 that includes windows 45A, 45B, and 45C, and is included in a screen of the multi-window system. Here, the window 45A is an active window and is displayed in the foreground, while the windows 45B and 45C overlap with the window 45A and are hidden. Accordingly, a user is not able to visually recognize the windows 45B and 45C. A part of the window 45C does not overlap with the window 45A. However, the user just recognizes that a part of some window is visible. Accordingly, it is difficult to recognize whether the visible part is a part of the window 45B or a part of the window 45C.

Thus, when the user would like to switch the active window from the window 45A to another window, it is necessary for the user to move a position of the window 45A with the operation unit 4 and to cause the display unit 2 to display the hidden windows 45B and 45C. The smartphone 1 according to the present modified example can distinguishably display a hidden window on the basis of a gaze point without such procedures. More specifically, when a gaze point does not stay at a fixed position, the estimation unit 12 estimates, as an intention of a user, that the user searches multiple windows included in a display image for a predetermined window. The display control unit 14 controls the display unit 2 such that a part of a window overlapping with and hidden behind another window in the display image is displayed so as to be distinguished by the user. Operational processing for the smartphone 1 to distinguishably display a part of each window by moving a position of the hidden window will be described below along the flowchart illustrated in FIG. 3.

First of all, as illustrated in FIG. 3, the detection unit 11 detects, in step S104, a gaze point 35 illustrated in FIG. 8. Here, as illustrated in FIG. 8, the gaze point 35 moves around on the display image 25-1.

Next, in step S108, the estimation unit 12 estimates an intention of a user on the basis of the gaze point 35. For example, the estimation unit 12 estimates, as an intention of the user, that the user searches multiple windows included in the display image for a desired window, on the basis that the gaze point 35 moves around on the display image 25-1, which namely means that the gaze point does not stay at a fixed position.

Subsequently, in step S112, the image generation unit 13 sets, as a final display image, an image 25-2 in which parts of the windows 45B and 45C are distinguishably displayed, in accordance with the intention that the user searches for a desired window. Here, as illustrated in FIG. 8, the user can recognize contents of each window from a title bar because the title bars of the windows 45B and 45C are distinguishably displayed in the image 25-2.

In the next step, the display control unit 14 controls the display unit 2 such that varying images are displayed in which positions of the windows 45B and 45C are moved by 1% per varying image from the display image 25-1 being currently displayed on the display unit 2 so as to be closer to the final display image 25-2.

As above, the smartphone 1 according to the modified example 4 has been described.

3. Conclusion

As described above, the smartphone 1 according to an embodiment of the present disclosure can estimate an intention of a user on the basis of a gaze point of the user, and implicitly vary screen display on the basis of the estimated intention. Specifically, the smartphone 1 can enhance readability of a text part, perform scrolling, switch an active window, or the like, as unconsciously intended by a user, on the basis of a position or movement of a gaze point. Moreover, no operation performed by a hand is necessary. Thus, while reducing a burden of an operation performed by a user with his/her hand, the smartphone 1 can assist the operation performed by the user with the hand by performing screen display according to an intention of the user.

It should be understood by those skilled in the art that various modifications, combinations, sub-combinations and alterations may occur depending on design requirements and other factors insofar as they are within the scope of the appended claims or the equivalents thereof.

For example, readability of a text part included in a display image is enhanced in the above-described embodiments. However, an embodiment of the present disclosure is not limited thereto. For example, visual recognizability of an image part included in a display image may also be enhanced. The image generation unit 13 may also enhance visual recognizability by enlarging an image part other than a text part included in a display image, enhancing luminance, or the like.

Furthermore, an intention of a user is estimated on the basis of a gaze point in the above-described embodiment. However, the embodiment of the present disclosure is not limited thereto. For example, the estimation unit 12 may also estimate an intention of a user in accordance with the blink of an eye of the user, dilatation and contraction of a pupil of the user, or the like.

A computer program for causing hardware such as a CPU, ROM, and RAM built in an information processing apparatus to realize the same function as the function of each structural element in the smartphone 1 can be created. A storage medium having the computer program stored therein is also provided.

Additionally, the present technology may also be configured as below.

(1) An information processing apparatus including:
a detection unit configured to detect a gaze point of a user in a display image displayed on a display unit;
an estimation unit configured to estimate an intention of the user based on the gaze point detected by the detection unit;
an image generation unit configured to generates a varying image that subtly varies from the display image to a final display image according to the intention estimated by the estimation unit; and
a display control unit configured to control the display unit in a manner that the varying image generated by the image generation unit is displayed.

(2) The information processing apparatus according to (1), wherein the varying image is an image in which an area far from the gaze point in the display image varies.

(3) The information processing apparatus according to (1) or (2),
wherein the varying image is an image in which an area at or near the gaze point in the display image varies.

(4) The information processing apparatus according to any one of (1) to (3),
wherein the image generation unit generates a plurality of the varying images; and
wherein the display control unit controls the display unit in a manner that the varying images generated by the image generation unit are gradually switched and displayed at a predetermined interval.

(5) The information processing apparatus according to any one of (1) to (4),
wherein the varying image is an image in which readability of a text part included in the display image is enhanced.

(6) The information processing apparatus according to (5),
wherein the image generation unit generates the varying image in which the readability of the text part included in the display image is enhanced through at least one of enhancement of resolution, enhancement of contrast with a background image, enlargement of a letter size, and edge enhancement.

(7) The information processing apparatus according to any one of (1) to (6),
wherein the estimation unit estimates an amount and direction of scrolling intended by the user based on a changing speed and changing direction of a position of the gaze point.

(8) The information processing apparatus according to any one of (1) to (7),
wherein the detection unit detects a gaze point of another user in the display image,
wherein the estimation unit estimates an intention of the other user based on the gaze point of the other user detected by the detection unit, and
wherein the image generation unit generates a varying image that subtly varies to a final display image that is against the intention of the other user estimated by the estimation unit.

(9) The information processing apparatus according to any one of (1) to (8),
wherein the display image is an image included in a screen of a multi-window system,
wherein the information processing apparatus further includes an edit control unit configured to control whether to activate a window included in the display image as an editable area,
wherein the estimation unit estimates the intention based on a position of the window included in the display image and the gaze point, and
wherein the edit control unit controls whether to activate the window, in accordance with the intention estimated by the estimation unit.

(10) The information processing apparatus according to (9),
wherein, when the gaze point is positioned on the window, the estimation unit estimates, as an intention of the user, that the window is activated, and
wherein the edit control unit activates the window.

(11) The information processing apparatus according to (9) or (10),
wherein, when the gaze point is positioned in a predetermined area of the window for a predetermined time, the estimation unit estimates, as an intention of the user, that the window is continuously activated, and wherein the edit control unit continuously activates the window until a predetermined instruction is issued.

(12) The information processing apparatus according to any one of (9) to (11), wherein, when the gaze point does not stay at a fixed position, the estimation unit estimates, as an intention of the user, that the user searches a plurality of windows included in the display image for a desired window, and wherein the display control unit controls the display unit in a manner that a part of the window is displayed distinguishably for the user, the window overlapping with and being hidden behind another window in the display image.

(13) The information processing apparatus according to (4), wherein the predetermined interval is at least 0.1 seconds or more.

(14) The information processing apparatus according to (4), wherein the varying images generated by the image generation unit are different from each other by 1%, and wherein the display control unit controls the display unit in a manner that a varying image out of the varying images is switched to, at the predetermined interval, a varying image varying by 1% from the varying image out of the varying images that is currently displayed.

(15) The information processing apparatus according to any one of (1) to (14), wherein the information processing apparatus is a smartphone.

(16) A non-transitory computer-readable storage medium having a program stored therein, the program causing a computer to execute:

detecting a gaze point of a user in a display image displayed on a display unit;

estimating an intention of the user based on the detected gaze point;

generating a varying image that subtly varies from the display image to a final display image according to the estimated intention; and controlling the display unit in a manner that the generated varying image is displayed.

What is claimed is:

1. An information processing apparatus, comprising:
    electrical circuitry configured to:
        acquire, from an imaging unit, gaze information on a first gaze point of a first user in a display image displayed on a display unit; and
        control the display unit to complete, before a far part area moves into a recognizable area of a field of view of the first user, an increase of a visibility of the far part area of the display image based on movement of the first gaze point towards the far part area,
        wherein the far part area of the display image is defined, based on the movement of the first gaze point, as an area positioned outside of the recognizable area of the field of view, and forward of the first gaze point in a direction of the movement of the first gaze point toward the far part area, and
        wherein the recognizable area contains the first gaze point.

2. The information processing apparatus according to claim 1, wherein the electrical circuitry is further configured to:
    generate a plurality of varying images; and
    control the display unit to gradually change the far part area with the plurality of varying images at a determined interval.

3. The information processing apparatus according to claim 2, wherein the determined interval is at least 0.1 seconds.

4. The information processing apparatus according to claim 2,
    wherein the plurality of varying images are different from each other by 1%, and
    wherein the electrical circuitry is further configured to control the display unit such that a first varying image of the plurality of varying images is switched to, at the determined interval, a second varying image that varies by 1% from the first varying image of the plurality of varying images that is currently displayed.

5. The information processing apparatus according to claim 1,
    wherein the display image includes a text part, and
    wherein the electrical circuitry is further configured to control the display unit to enhance the text part to increase the visibility of the far part area.

6. The information processing apparatus according to claim 5, wherein the electrical circuitry is further configured to control the display unit to increase readability of the text part at the far part area through at least one of enhancement of resolution, enhancement of contrast with a background image, enlargement of a letter size, or edge enhancement.

7. The information processing apparatus according to claim 1, wherein the electrical circuitry is further configured to:
    increase a scrolling speed of the display image based on an increase in a speed of movement of the first gaze point;
    control the display image to scroll based on the direction of the movement of the first gaze point at the increased scrolling speed;
    decrease the scrolling speed of the display image based on a decrease in the speed of movement of the first gaze point; and
    control the display image to scroll based on the direction of the movement of the first gaze point at the decreased scrolling speed.

8. The information processing apparatus according to claim 1, wherein the electrical circuitry is further configured to:
    acquire, from the imaging unit, gaze information on a second gaze point of a second user in the display image;
    determine whether the second user is registered as an owner of the information processing apparatus; and
    decrease the visibility of the display image based on the determination that the second user is different from the owner of the information processing apparatus,
    wherein the visibility of the display image is decreased to prevent gaze of the display image by the second user.

9. The information processing apparatus according to claim 1,
    wherein the display image includes an active window and a non-active window,
    wherein the electrical circuitry is further configured to increase a viewability of an overlapped area of the non-active window as the far part area of the display image,
    wherein the overlapped area is overlapped with a part of the active window.

10. The information processing apparatus according to claim 9, wherein the electrical circuitry is further configured to activate the non-active window until a determined instruction is issued, based on the first gaze point that is positioned in a determined area of the non-active window for a determined time.

11. The information processing apparatus according to claim 1,
wherein the display image includes a plurality of windows having respective titles,
wherein the electrical circuitry is further configured to control the display unit to rearrange the plurality of windows such that each of the respective titles is visible based on the first gaze point that moves back and forth.

12. The information processing apparatus according to claim 1,
wherein the information processing apparatus is one of a smartphone, a head mounted display, a digital camera, a digital video camera, a personal digital assistant, a personal computer, a notebook, a tablet terminal, a mobile phone terminal, a portable music player, a portable video processing apparatus, or a portable game console.

13. The information processing apparatus according to claim 12, wherein
the display unit includes a screen,
the imaging unit images the first user, and
the imaging unit is arranged at a position of the information processing apparatus to image an eye of the first user while the first user views the screen.

14. The information processing apparatus according to claim 13, further comprising an input sensor configured to receive hand-operation input of the first user.

15. The information processing apparatus according to claim 14, wherein the display unit is a touch panel display that comprises the input sensor.

16. The information processing apparatus according to claim 1,
wherein the display image includes a text part, and
wherein the electrical circuitry is further configured to control the display unit to increase the number of letters in the text part based on a speed of movement of the first gaze point.

17. A non-transitory computer-readable medium storing instructions that, when executed by a processor, cause the processor to execute operations, the operations comprising:
acquiring, from an imaging unit, gaze information on a gaze point of a user in a display image displayed on a display unit; and
controlling the display unit to complete, before a far part area moves into a recognizable area of a field of view of the user, an increase of a visibility of the far part area of the display image based on movement of the gaze point towards the far part area,
wherein the far part area of the display image is defined, based on the movement of the gaze point, as an area positioned outside of the recognizable area of the field of view, and forward of the gaze point in a direction of the movement of the gaze point toward the far part area, and
wherein the recognizable area contains the gaze point.

18. The information processing apparatus according to claim 1, wherein the electrical circuitry is further configured to determine a gaze intention of the first user based on whether the first user stares the display image for a determined time.

* * * * *